United States Patent [19]

Kinney

[11] Patent Number: 5,424,826
[45] Date of Patent: Jun. 13, 1995

[54] WIDEBAND OPTICAL MICRO-SPECTROMETER SYSTEM

[75] Inventor: Terrance R. Kinney, South Bend, Ind.

[73] Assignee: Control Development, Inc., South Bend, Ind.

[21] Appl. No.: 99,308

[22] Filed: Jul. 30, 1993

[51] Int. Cl.⁶ .......................... G01J 3/28; G01J 3/18
[52] U.S. Cl. ................................. 356/326; 356/328
[58] Field of Search ............... 356/326, 328, 330–334; 250/227.23

[56] References Cited

U.S. PATENT DOCUMENTS

| | | | |
|---|---|---|---|
| 4,111,524 | 9/1978 | Tomlinson | 385/37 |
| 4,198,117 | 4/1980 | Kobayashi | 385/37 |
| 4,335,933 | 6/1982 | Palmer . | |
| 4,758,085 | 7/1988 | Lequime et al. | 356/328 |
| 4,850,706 | 7/1989 | Mikes | 356/328 |
| 4,852,079 | 7/1989 | Kinney et al. | 356/328 |
| 4,878,728 | 11/1989 | Mannschke | 385/14 |
| 4,938,553 | 7/1990 | Maerz et al. | 385/37 |
| 5,020,910 | 6/1991 | Dunn et al. | 356/328 |
| 5,037,201 | 8/1991 | Smith et al. | 356/328 |

FOREIGN PATENT DOCUMENTS

| | | |
|---|---|---|
| 493132A1 | 7/1992 | European Pat. Off. . |
| 56-119822 | 9/1981 | Japan ................. 356/328 |

OTHER PUBLICATIONS

Lang, "Integrated Grating Spectrometer," NASA's Jet Propulsion Laboratory, Sep. 1990, p. 802.
Tomlinson et al, "Optical multiplexer for multimode fiber transmission systems," Applies Physics Letters, vol. 31, No. 3, Aug. 1977, pp. 169–171.
Nishi et al, "Broad–passband–width optical fiber for multi/demultiplexer using a diffraction grating and a retroreflector prism," Electronic Letters, vol. 31, No. 10, May 1985, pp. 423–424.

Primary Examiner—Vincent P. McGraw
Assistant Examiner—K. P. Hantis
Attorney, Agent, or Firm—Lawrence R. Franklin

[57] ABSTRACT

A wideband optical micro-spectrometer system for detecting the intensity of light as a function of wavelength. The device employs multiple optical micro-spectrometers generating adjacent spectra mounted onto a single photodetector array and digital processing techniques to generate a continuous wide spectrum from the narrower spectrums generated by the optical micro-spectrometers. Optical micro-spectrometers generating non-adjacent spectra could also be employed to produce spectral data for predetermined non-adjacent spectral ranges. System reliability is improved and maintenance reduced with the use of pre-aligned optical micro-spectrometers. Thereby, a device is created which has the spectral range of larger spectrometers having a much reduced physical size, increased system reliability and reduced maintenance requirements.

14 Claims, 4 Drawing Sheets

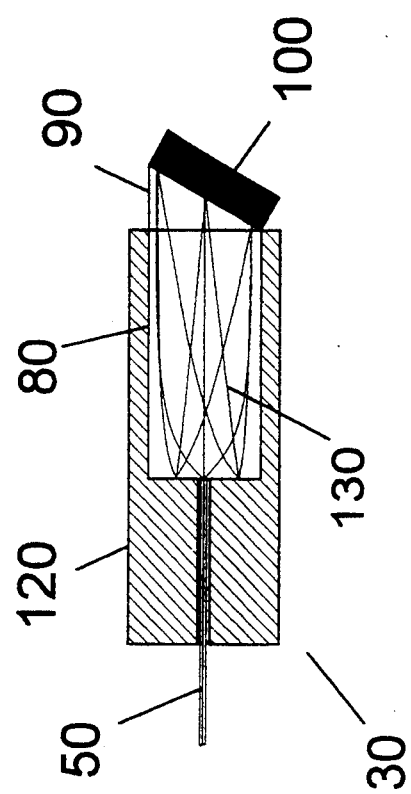
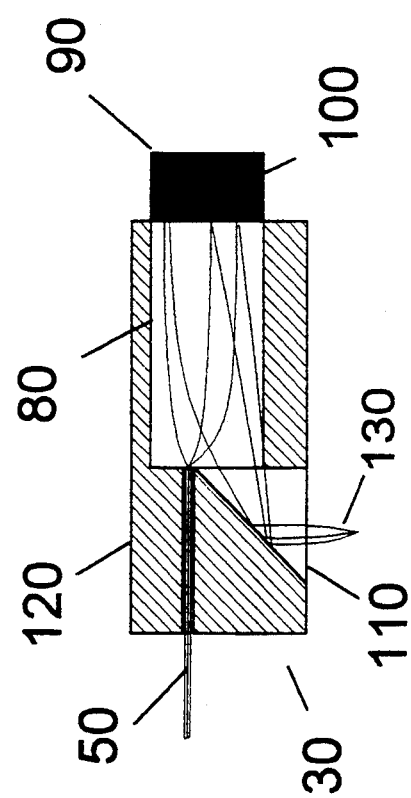

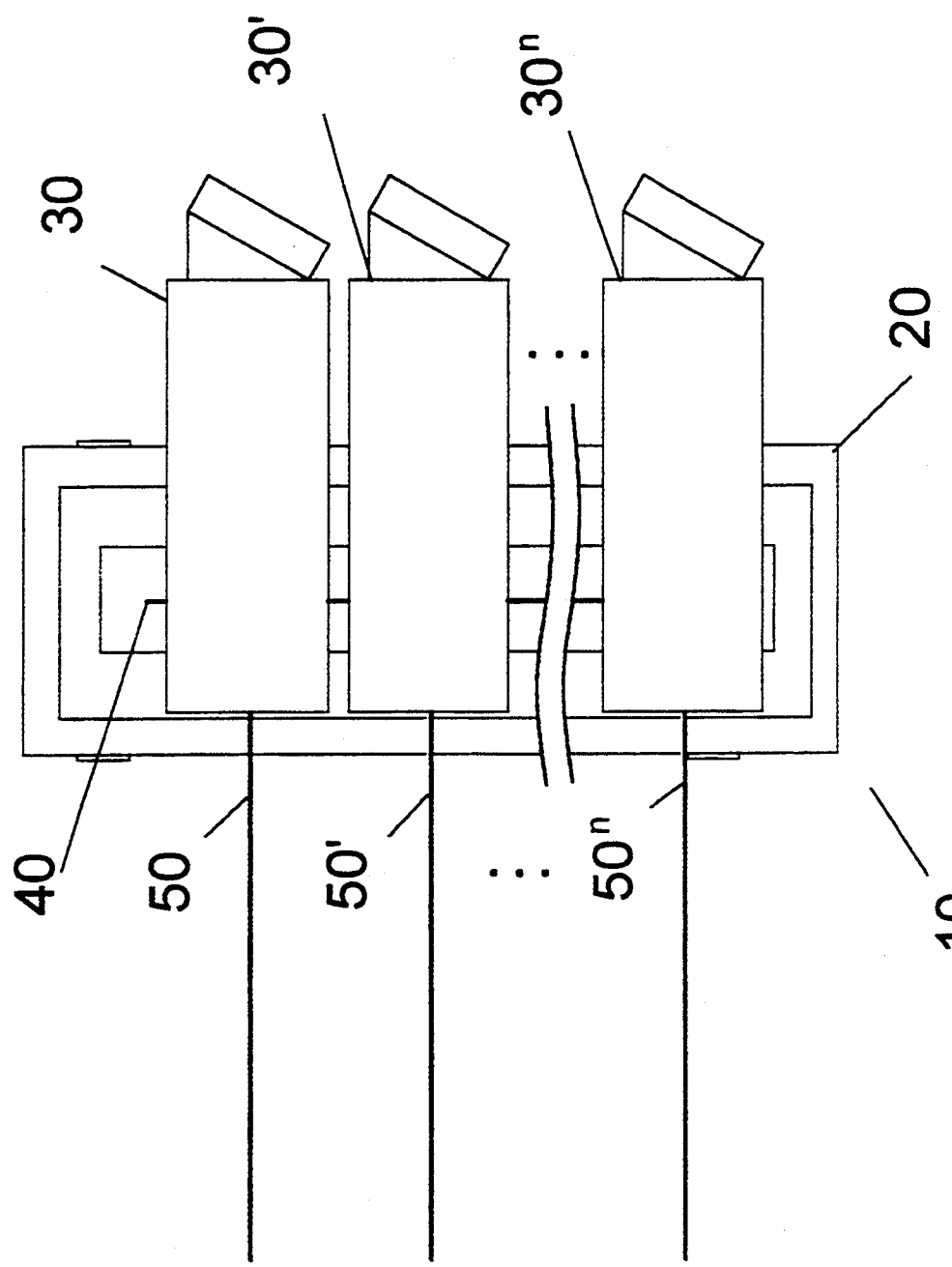

WIDEBAND OPTICAL MICRO-SPECTROMETER SYSTEM

BACKGROUND OF THE INVENTION

The invention relates to an optical spectrometer system which detects the intensity of light as a function of wavelength.

Optical spectrometers are commonly used for the detection and subsequent analysis of light signals. The optical spectrum is what the human eye sees when light is diffracted by water in the atmosphere and forms a rainbow. Each color of light in the rainbow is defined by its own wavelength. The human eye actually measures the wavelength and intensity of light when it "sees" color and brightness. However, in order to measure the composition of light consistently and precisely, an optical spectrometer is generally used. The optical spectrometer measures intensity, or brightness of light as it relates to wavelength, or colors contained within the light.

This optical spectrum analysis is commonly used for chemical analysis, optics research and optics sensor development. Other applications include paint matching, quality control for packaging, food, cosmetics, color cathode ray tubes, automobile tail light lenses, etc.

Typically, an arrangement of entrance slits, lenses, mirrors and gratings are used to align, project, chromatically disperse and focus light signals to be analyzed into a spectral band which is projected onto a photodetector array. The spectral range and resolution of the spectrometer are governed by the focusing power of the lenses or curved mirrors, the resolution of the grating, the entrance slit width, the number of photodetectors within the photodetector array and the individual photodetector element spacing.

In the special case of a monochronomator, the light signals to be analyzed are passed through a narrow entrance slit or hole, projected onto a diffraction grating via a lens or curved reflective mirror, and refocused via a lens or curved reflective mirror into a spectral band which is projected through a narrow exit slit or hole onto a single photodetector. The grating is rotated, projecting a narrow wavelength band of light through the exit slit or hole, the center wavelength of which is a function of the grating angle.

Disadvantages of the spectrometers and monochronomators described include large physical size and susceptibility to contamination.

An optical micro-spectrometer is described in U.S. Pat. No. 4,198,117. This device utilizes a graded index (GRIN) lens along with a dispersion grating and optical fibers. This device offers a great reduction in size and is not susceptible to contamination since the path of the signal light always remains within a solid optical path. Yet this device has the disadvantage of a limited resolution/total spectral bandwidth product. As one attempts to achieve higher resolution, the total spectral bandwidth is reduced, and vice versa. Limiting constraints in this device also include maximum aperture of the lens which can be fabricated, focal length variation as a function of wavelength, and large overall physical size required for a device designed to cover a wide optical bandwidth while having fine spectral resolution.

SUMMARY OF THE INVENTION

The inventive optical micro-spectrometer system disclosed herein incorporates a plurality of optical micro-spectrometers having fiber optic conductors for receiving input light from a source, the plurality of optical micro-spectrometers being mounted on a single photodetector array or a plurality of photodetector arrays. Each of the optical micro-spectrometers covers a specific spectral bandwidth. By judicious selection of the number of micro-spectrometers and photodetector elements used and the width of the spectral range which each of the optical micro-spectrometers covers, a wide contiguous spectral range can be detected without sacrificing spectral resolution. The optical micro-spectrometers can as well be fabricated to detect non-contiguous spectral ranges to allow the simultaneous detection of specific spectral ranges of interest with very high spectral resolution. The system can thereby cover a wide spectral range, or specific spectral ranges, while simultaneously providing high spectral resolution.

It is therefore an object of the invention to provide an optical spectrometer system which covers a wide contiguous spectral range while concurrently providing high spectral resolution.

Yet another object of the invention is to provide an optical spectrometer system which can simultaneously detect specific spectral ranges with high spectral resolution.

Still another object of the invention is to provide an optical spectrometer system which is characterized by a small physical size.

Yet another object of the invention is to provide an optical spectrometer system which is insensitive to contamination.

Still another object of the invention is to provide an optical spectrometer system which incorporates fiber optic conductors for receiving input light from a source.

These and other objects and purposes of the invention will be best understood in view of the following detailed description of the invention taken in conjunction with the appended drawings.

BRIEF DESCRIPTION OF THE DRAWINGS

FIGS. 2a and 2b show sectional side and top views, respectively, of a typical optical micro-spectrometer in which is shown a family of optic ray traces plotting the path of light through the optical micro-spectrometer;

FIG. 4 shows a second embodiment in which each micro-spectrometer has an independent input.

DESCRIPTION OF THE PREFERRED EMBODIMENTS

Figure 1:
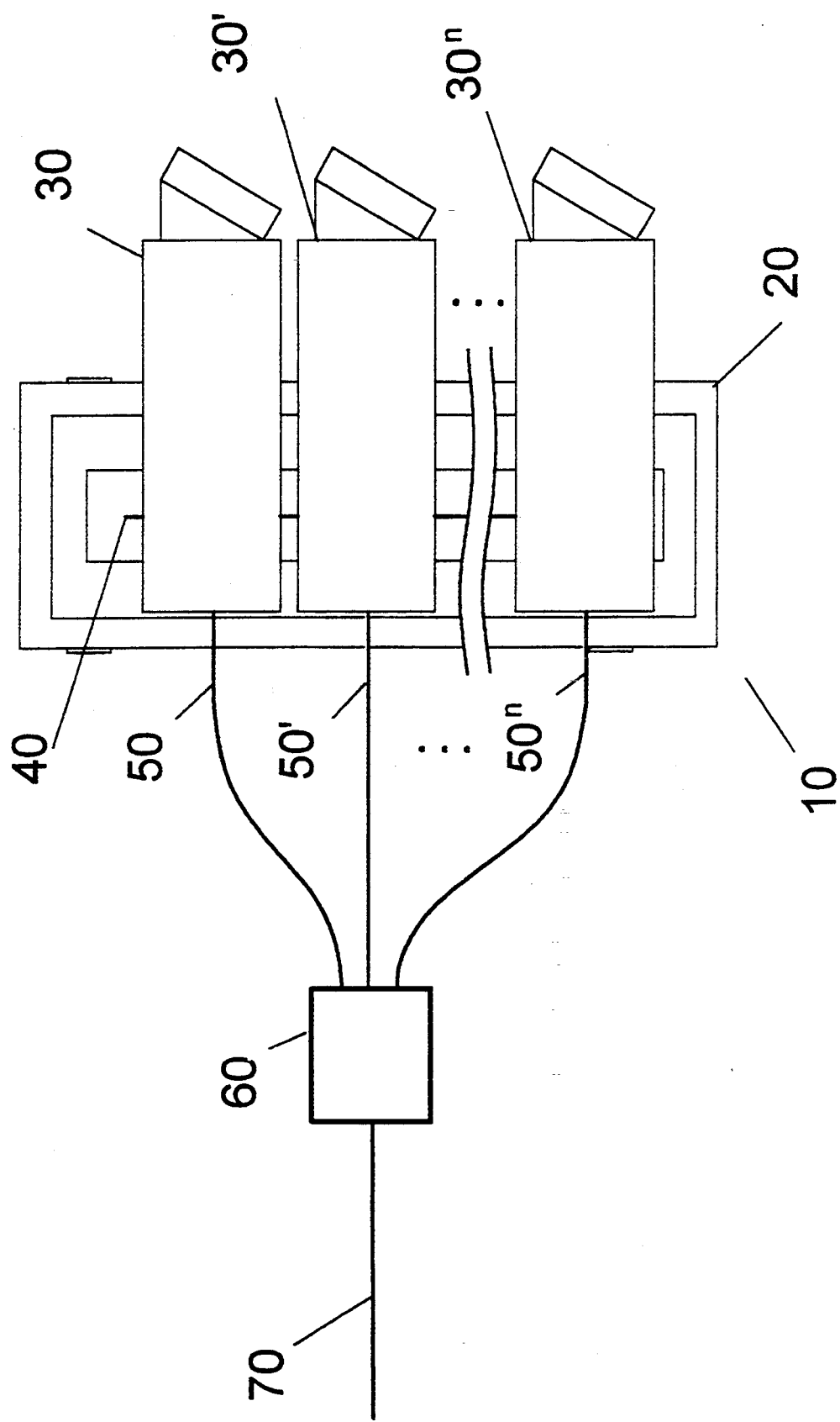
FIG. 1 shows a schematic illustration of a plurality of optical micro-spectrometers mounted onto a single photodetector array.

First Embodiment:

Referring to FIG. 1, there is shown a wideband optical micro-spectrometer system 10 made according to the principles of this invention.

System 10 has an input fiber optic conductor 70 in which the light signals to be analyzed are launched. A $1 \times N$ fiber-optic splitter 60 is employed to divide and launch light from the input fiber optic conductor 70 to fiber optic conductors 50, 50' through $50^n$. Fiber optic conductors 50, 50' through $50^n$ conduct the divided portions of the light signals to optical micro-spectrometers 30, 30' through 30$^n$, respectively. Splitter 60 provides the same full spectrum of light signals present in input fiber optic conductor 70 to each of fiber optic conductors 50, 50' through 50$^n$, so each optical micro-spectrometer 30, 30' through 30$^n$ receives the same input light signals.

Optical micro-spectrometers 30, 30' through 30$^n$ each separate a narrow spectral band from the input light signals. The optical micro-spectrometers 30, 30' through 30$^n$ are constructed such that each produces a spectral band having a limited spectrum of juxtaposed spectral elements which covers a portion of the total spectrum of interest different from the spectral bands of all the other optical micro-spectrometers. The number of optical micro-spectrometers employed is selected such that the total spectrum of interest is covered.

The optical micro-spectrometers could be selected such that their respective spectral bands overlap the spectral bands of the optical micro-spectrometers covering the adjacent spectral portions to ensure contiguous coverage of the total spectrum of interest.

Optical micro-spectrometers 30, 30' through 30$^n$ are mounted upon a linear photodetector array 20. Although a photodetector array is shown, any multiple detector construct having a plurality of juxtaposed photodetector elements could be employed, such as a series of closely spaced individual photodetectors. A photodetector array is a special case of this multiple detector construct where the photodetector elements are very closely spaced onto a monolithic structure and where additional circuitry to process the signals from the photodetectors may also reside. The use of photodetector arrays simplify packaging and circuit design.

Each of the optical micro-spectrometers 30, 30' through 30$^n$ are aligned upon linear photodetector array 20 such that each of the spectral bands emitted from the optical micro-spectrometers 30, 30' through 30$^n$ are focused upon a plurality of photodetector elements 40 within photodetector array 20. In the example shown in FIG. 3, approximately 200–250 photodetector elements respond to each optical micro-spectrometer. These numbers are shown as exemplary only. Any suitable ratio could be chosen depending on the characteristics of the input light signals which are sought.

Fiber optic conductors 50, 50' through 50$^n$ have optical cores through which the light signals travel. The diameter of the optical cores for fiber optic conductors 50, 50' through 50$^n$ are such that the light emitted from fiber optic conductors 50, 50' through 50$^n$ do so from an area similar to the input area of a single photodetector element of photodetector elements 40. With this criteria, the optical cores of fiber optic conductors 50, 50' through 50$^n$ act as entrance slits for optical micro-spectrometers 30, 30' through 30$^n$ improving the optical spectral resolution of optical micro-spectrometers 30, 30' through 30$^n$. Alternatively, slits or holes can be placed in optical micro-spectrometers 30, 30' through 30$^n$ immediately following fiber optic conductors 50, 50' through 50$^n$, respectively, to improve spectral resolution. In still an additional construct, slits or holes in combination with larger core diameter fiber optic conductors could be used to allow more of the light signal to be analyzed, further improving sensitivity.

The optical micro-spectrometers 30, 30' through 30$^n$ for the optical micro-spectrometer system 10 are similarly constructed and only optical micro-spectrometer 30 is illustrated in detail in FIGS. 2a and 2b.

FIG. 2a shows a sectional side view of optical micro-spectrometer 30, while FIG. 2b shows a sectional top view of optical micro-spectrometer 30.

The light signals are shown as optical ray traces 130 passing through fiber optic conductor 50, GRIN lens 80, and prism 90 onto diffraction grating 100, back through prism 90 and GRIN lens 80, and through mirrored prism 110, being focused into spectral bands outside optical micro-spectrometer 30. Light signals conducted through fiber optic conductor 50 are presented to GRIN lens 80 which substantially collimates the light signals, generating a substantially collimated beam of light. Although a GRIN lens is shown, other lenses or combination of lenses can be employed in combination with the GRIN lens or in place of the GRIN lens to function as the lens system. The beam of light then projects upon the diffraction grating 100 through prism 90. Prism 90 acts as a mount for diffraction grating 100, holding it at a predetermined angle to the projected beam of light. The beam of light is reflected and spectrally diffracted by the diffraction grating generating spectrally diffracted beams of light which pass back through GRIN lens 80 via prism 90 where GRIN lens 80 focuses the spectrally diffracted beams of light. Mirrored prism 110 has a reflective surface on its hypotenuse which reflects the focusing spectrally diffracted beams of light such that they focus upon photodetector elements 40 of photodetector 20.

Housing 120 holds all optical micro-spectrometer components, the combination forming an integral structure which insures accurate alignment and ease of construction. The integral, fixed structure provides easier low-profile packaging of the optical micro-spectrometers 30, 30' through 30$^n$. Further, having diffraction grating 100 fixed in each micro-spectrometer permits easy selection and substitution of micro-spectrometers of known spectral characteristics. Making the base, as seen in FIG. 2a, of the unit planar allows the optical micro-spectrometer's lens system to be mounted parallel to the plane of photodetector array 20 and still focus the spectral lines of optical micro-spectrometers 30, 30' through 30$^n$ onto the corresponding photodetector elements 40 of photodetector array 20. The characteristics and geometry of fiber optic conductor 50, GRIN lens 80, prism 90, diffraction grating 100 and mirrored prism 110 are chosen such that the focal line of the emitted spectral band focuses onto the photodetector elements 40 of photodetector array 20. Additional considerations to be taken when deciding on these characteristics include the optical micro-spectrometer's spectral spread and resolution.

Figure 3:
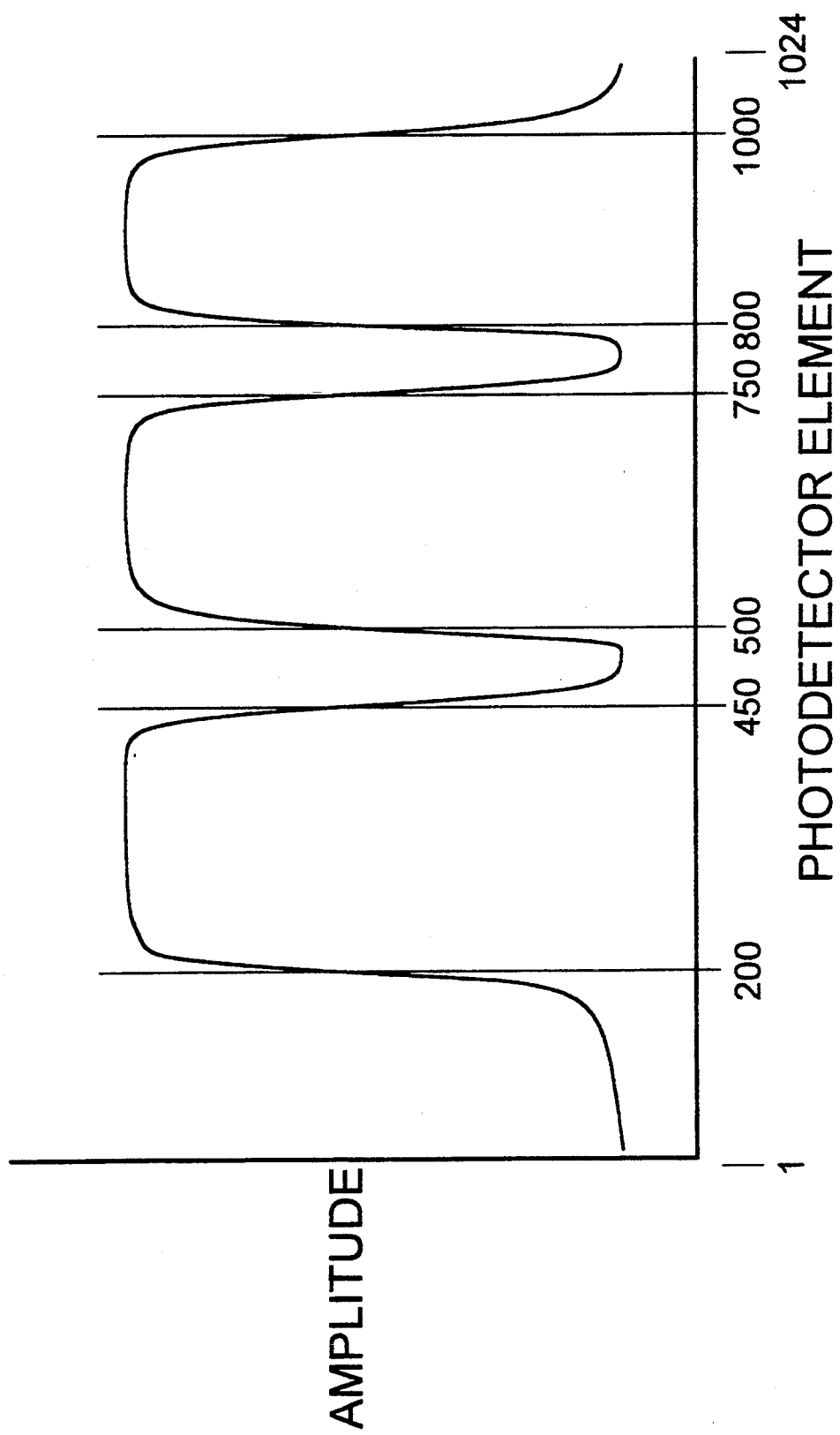
FIG. 3 shows a plot of the photodetector array output of the wideband optical micro-spectrometer system having an input light signal characterized by a constant intensity over the detected spectral range.

The electrical output signals from photodetector array 20 employing three optical micro-spectrometers are shown in FIG. 3.

The spectra emitted from the optical micro-spectrometers 30, 30' through 30$^n$ are focused upon photodetector elements 40 of photodetector array 20. Electrical signals are produced from each of the photodetector elements 40. The amplitude of each of the electrical signals output from photodetector elements 40 corresponds to and represents the intensity of light of a predetermined portion of a continuous band of juxtaposed spectral elements in the spectral band emitted from the optical micro-spectrometers 30, 30' through 30$^n$. These amplitudes are depicted in FIG. 3 where the horizontal axis represents individual photodetector elements 1 through 1024 of photodetector elements 40 and the vertical axis represents the magnitude of the amplitudes of the electrical signals from photodetector elements 40. 1024 individual photodetector elements were chosen for illustrative purposes only, and any number of individual photodetector elements may be employed to satisfy design requirements of bandwidth, resolution and other design parameters. Likewise, the individual photodetectors responding to the optical micro-spectrometer are illustrative, and will vary depending on placement and geometry of the optical micro-spectrometers. The spectral band emitted from optical micro-spectrometer 30 causes an increased amplitude of the electrical signals from individual photodetector elements 200 through 450 of photodetector elements 40. Similarly, the spectral bands emitted from optical micro-spectrometers $30^1$ and $30^2$ causes an increased amplitude of the electrical signals from individual photodetector elements 500 through 750 and individual photodetector elements 800 through 1000, respectively. All other individual photodetector elements of photodetector elements 40 which are not illuminated by spectral lines emitted from optical micro-spectrometers 30 through $30^2$ have their respective electrical signals remain at a low amplitude.

Through electronic signal conditioning, electrical signals from photodetector elements 40 can be selectively arranged by the spectral element they represent, to produce electronic data representative of the total contiguous spectrum of the input light signals. Variations in amplitude and offset of each of the individual photodetector elements' electrical signals of photodetector elements 40, caused by optical as well as electrical phenomena, can also be removed, normalized or otherwise compensated for through electronic signal conditioning.

In a variation of this system, to capture only spectral ranges of interest which may or may not be contiguous, the electrical signals from photodetector elements 40 can be selectively arranged to group together spectral ranges of interest and by electronic signal conditioning remove the electronic signals of photodetector elements 40 representing spectral elements not of interest. A further variation of this system could have the spectral bands emitted from the optical micro-spectrometers not adjacent and without overlap covering only the spectra of interest. Yet a further variation could include optical micro-spectrometers whose emitted spectral band covers the same spectral range as other optical micro-spectrometers but has a different spectral spread. This would allow the analysis of the overall spectrum and simultaneously with higher resolution, a particular portion of the spectrum. Still a further variation could employ optical micro-spectrometers with similar spectral coverage to simultaneously analyze the same spectra thus allowing averaging of spectral elements, or providing redundancy to eliminate errors due to optical or electronic defects or failures.

Second Embodiment:

The system and all of its variations could be constructed without the 1×N splitter allowing each spectrometer to analyze light signals from different light sources thus allowing simultaneous analysis of multiple light signals. As seen in FIG. 4, each of the optical micro-spectrometers 30, 30' through $30^n$ has an independent input, namely, fiber optic conductors 50, 50' through $50^n$, respectively. Each input receives light from a different light source, in contradistinction to the common light source of input fiber optic conductor 70 of FIG. 1.

The system and all of its variations could additionally include a plurality of photodetector arrays where one or more optical micro-spectrometers are aligned upon each photodetector array to increase system speed or reduce system size and cost.

Although the invention has been described through specific terms, it is to be noted here that the described embodiments are not exclusive and various changes and modifications may be imparted thereto without departing from the scope of the invention which is limited solely by the appended claims.

I claim:

1. A wideband optical micro-spectrometer system for analyzing the intensity of light as a function of wavelength, said system comprising:

supply means for supplying input light signals;

a plurality of micro-spectrometers for dividing said input light signals into a corresponding plurality of spectral bands, each having a relatively small, predetermined bandwidth of wavelengths, each of said micro-spectrometers comprising:

input means for receiving said input light signals;

lens means for collimating said input light signals; and selection means comprising a combination prism and diffraction grating for selecting a spectral portion of said input light signals, said spectral portion comprising said spectral band, each of said selection means of said plurality of micro-spectrometers selecting a different spectral portion of said input light signals than is selected by the remainder of said micro-spectrometers; and multiple detector means responsive to the spectral bands from said plurality of micro-spectrometers for generating electrical signals whose amplitudes correspond to the intensities of the wavelengths of light of said spectral bands, each of said lens means focusing said spectral band selected by said selection means onto a portion of said multiple detector means.

2. The micro-spectrometer system of claim 1 wherein:

said multiple detector means comprises a photodetector array.

3. The micro-spectrometer system of claim 1 wherein:

said multiple detector means comprises photodetector means which generate said electrical signals; and said system further comprises electronic means for processing said electrical signals from said photodetector means to produce electronic data representing the spectrum of said input light.

4. The micro-spectrometer system of claim 1 wherein:

said input means comprises:

a fiber optic conductor for transmitting said input light signals from said supply means to said lens means.

5. The micro-spectrometer system of claim 4 further comprising:

slit means associated with each of said micro-spectrometers for improving the spectral resolution of said each micro-spectrometer, said slit means being located at the juncture of said fiber optic conductor and said lens means.

6. The micro-spectrometer system of claim 1 wherein:

said lens means comprises a GRIN lens.

7. The micro-spectrometer system of claim 1 wherein:
   each of said micro-spectrometers further comprises housing means; and
   said input means, said lens means, and said selection means are joined together with said housing means into an integral structure.

8. The micro-spectrometer system of claim 1 wherein:
   said different spectral portions have wavelengths at the extremities of said spectral band which overlap corresponding extremities of spectral portions of other micro-spectrometers.

9. The micro-spectrometer system of claim 1 wherein:
   said supply means comprises:
   a fiber optic conductor for receiving said input light signals from a source; and
   a splitter for dividing said input light signals into a plurality of light signals.

10. The micro-spectrometer system of claim 1 wherein:
    said supply means comprises:
    a separate fiber optic conductor for each of said plurality of micro-spectrometers, each of said separate fiber optic conductors receiving an input light signal from a different source than the remainder of said separate fiber optic conductors.

11. A wideband optical micro-spectrometer system for analyzing the intensity of light as a function of wavelength, said system comprising:
    (A) a fiber optic conductor for receiving input light signals from a source;
    (B) a splitter for dividing said input light signals into a plurality of light signals;
    (C) a plurality of micro-spectrometers, each of said micro-spectrometers comprising:
        (1) input means for receiving said input light signals;
        (2) lens means for collimating said input light signals;
        (3) a combination prism and diffraction grating for diffracting said collimated input light signals into a spectral band, said spectral band comprising a relatively small, predetermined bandwidth of wavelengths, each of said plurality of micro-spectrometers selecting a different spectral band of said input light signals than is selected by the remainder of said micro-spectrometers;
        (4) said lens means focusing said spectral band; and
        (5) a mirrored prism for projecting said spectral band;
    (D) a plurality of fiber optic conductors for transmitting said plurality of light signals from said splitter to the corresponding plurality of said micro-spectrometers; and
    (E) a photodetector array responsive to the spectral bands from said mirrored prisms of said plurality of micro-spectrometers for generating electrical signals whose amplitudes correspond to the intensities of light of the wavelengths of said spectral bands.

12. The micro-spectrometer system of claim 11 further comprising electronic means for processing said electrical signals from said photodetector array to produce electronic data representing the spectrum of said input light.

13. The micro-spectrometer system of claim 11 wherein:
    said lens means comprises a GRIN lens.

14. The micro-spectrometer system of claim 11 wherein:
    each of said micro-spectrometers further comprises housing means; and
    said input means, said lens means, said combination prism and diffraction grating, and said mirrored prism are joined together with said housing means into an integral structure.

* * * * *